April 3, 1928. 1,664,493
H. F. SMITH
VALVE
Filed Jan. 27, 1922
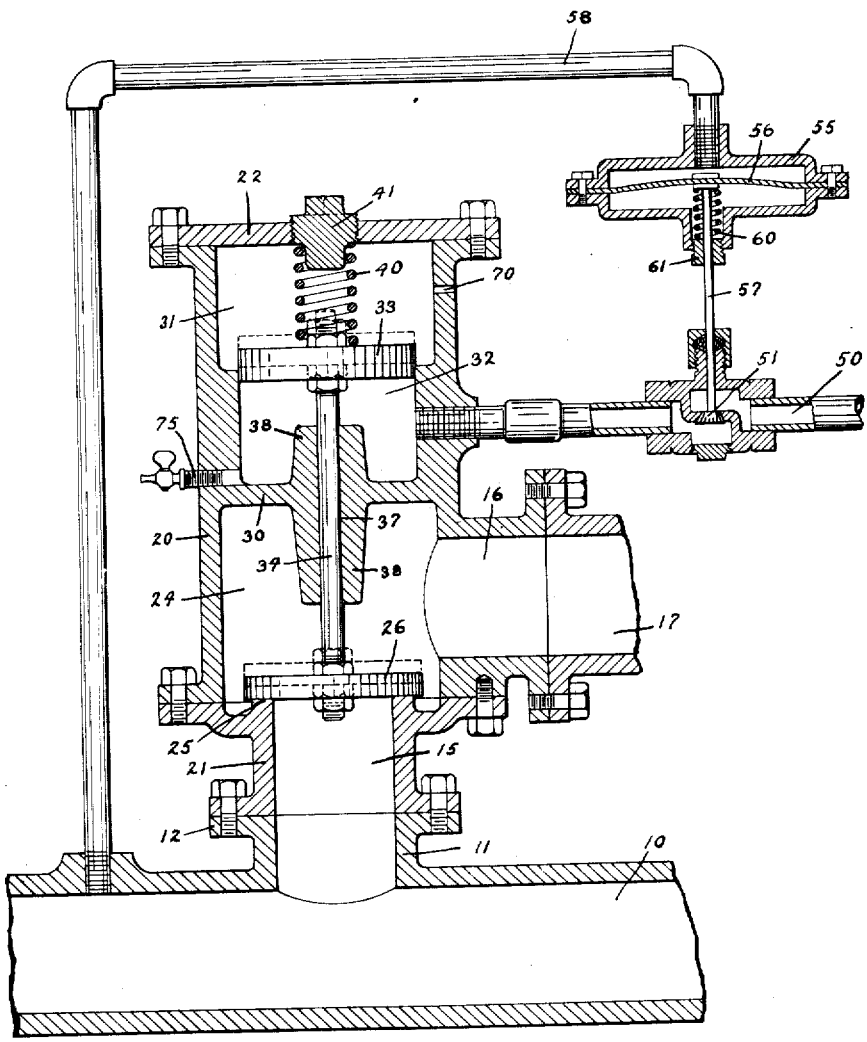

Patented Apr. 3, 1928.

1,664,493

UNITED STATES PATENT OFFICE.

HARRY F. SMITH, OF DAYTON, OHIO, ASSIGNOR TO THE GAS RESEARCH COMPANY, OF DAYTON, OHIO, A CORPORATION OF OHIO.

VALVE.

Application filed January 27, 1922. Serial No. 532,145.

This invention relates to an improved form of valve, and more particularly to a form of pressure relief valve.

One object of the invention is to provide a pressure operated valve which is simple in construction, and thoroughly reliable in operation.

Another object of the invention is to provide a pressure relief valve, so constructed that in case the valve tends to stick, thus preventing its opening when the predetermined pressure has been reached, a positive force will be exerted upon the valve to overcome this tendency to stick, so that the valve will be responsive to pressures in the main with which it is associated.

Other objects and advantages of the present invention will be apparent from the description thereof set out below when taken in connection with the accompanying drawing, in which is illustrated a sectional view through a form of valve mechanism embodying this invention.

Of course, so called pressure relief valves or pressure operated valves are well known, and their use is quite general where it is desired that the pressure within a delivery main, or other container, shall not rise above a predetermined maximum. For example, where a gas producer is provided for supplying a combustible gas for use in furnaces and the like, the pumps which force the gas through the delivery main, under pressure, to the place of use, have suitable governing mechanism which so controls the operation of the pumps that the pressure of the gas within the delivery main is normally maintained substantially constant. A form of governing mechanism of this character is shown in the patents issued to Harry F. Smith, No. 1,381,512 dated June 14, 1921 and No. 1,381,513 dated June 14, 1921. As brought out in each of those patents the governing mechanism is designed not only to so control the pumps that a substantially uniform pressure is maintained within the delivery main, but it is also so constructed that the pumps may not slow down, in operation, below a predetermined minimum number of revolutions per minute. If, by way of further explanation, all of the work devices to which gas is being supplied should suddenly be shut down at the same time, the tendency would be for the governing gear, which is responsive to pressure in the delivery main, to entirely stop the pumps. This would be unsatisfactory for the plant should be in such operating condition that gas is available at all times. Therefore, as described in the above referred to patents, the governing mechanism is so constructed that regardless of increase in pressure in the mains the engines driving the pumps may not be throttled below a predetermined minimum operating speed. But with the engines throttled down to this predetermined minimum speed, and with no gas being withdrawn from the main at the work devices, the pressure within the main tends to rise, and unless some means is provided for preventing this rise in pressure the result will be the building up of sufficient pressure to stall the engines. In order to take care of this condition, a pressure relief valve is provided in the delivery main which is adapted to open so soon as the pressure within the main rises to a predetermined maximum. This valve having opened, upon the attainment of this predetermined maximum pressure, there is thereafter no danger of stalling the engines, but a quantity of the gas is vented to atmosphere.

Theoretically any one of the forms of commercially satisfactory pressure-relief valves is suitable for use in connection with such a gas delivery main. But practically this is not true.

Producer gas, especially that made from soft coal, contains considerable quantities of heavy hydrocarbons or tar which, though they may be quite fluent at the temperatures prevailing, during operation of the producer, in the gas in that part of the main with which the pressure relief valve is associated, are of such character that when cold they become pitch like in form, sometimes being practically solid. During gas making operations some of this tar is deposited around the seat of the pressure-relief valve, especially when the valve is open for venting gas to the atmosphere, and, as a result, when the tar has hardened it tends to hold the valve to its seat so that the valve is prevented from opening upon building up of pressure, and satisfactory operation of the plant thus interfered with.

In addition to interfering with the satisfactory operation of the plant, sticking of the pressure relief valve is fraught with danger, for when the pressure in the main builds up there is a tendency to back the gas into the ash pit of the producer where it mixes with the incoming air to form explosive mixtures; and as a result of this condition very violent and destructive explosions have been known to occur.

So far as known the pressure relief valves heretofore designed are objectionable where they are used in connection with a gas producer main or with a main through which is being conveyed a fluid containing impurities tending to bind or stick the valve to its seat. The valve forming the subject matter of this invention is so constructed as to eliminate this objectionable feature, and though primarily designed for use in connection with a gas producer plant it is of general application.

As illustrated in the drawing this valve is associated with a delivery main 10, through which gas from a gas producer, or any other suitable source, is delivered to a place of use or storage. Leading off from the delivery main 10 is a branch pipe 11, provided with a suitable flange 12, by means of which the pipe 11 is attached to the inlet passage 15 of the casing of a pressure operated valve, the outlet passage 16 of that valve being in turn connected to the vent pipe 17, which opens into the stack or to atmosphere. Any suitable means of attaching the valve casing to the pipe 11 and to the pipe 17 may be provided, the means shown consisting of a bolted flange construction being purely conventional.

The valve casing consists of a body member 20, the lower end of which is closed by means of a seat carrying member 21, and the upper end by means of a suitable cap or closure 22. The seat carrying member 21 has the inlet passage 15 therein, which is adapted to register with the passage within the pipe 11, when the valve is in position, the inner end of this passage, where it opens into the chamber 24, within the body member of the valve, being surrounded by a valve seat 25, with which cooperates a disc valve 26. The outlet passage 16 leads off from the chamber 24, the construction of the valve being such that when the valve 26 is upon the seat 25 the pipe 11 is cut off from connection with the vent pipe 17, but when the valve 26 is lifted from its seat the pipe 11 is connected to the pipe 17 to thus permit the escape of gas from the pipe 10 into the stack, or directly into the atmosphere.

Positioned within the body member 20 and intermediate the ends thereof, is a partition 30, which separates the valve chamber 24 from a cylinder chamber 31, in the upper part of the body member 20. This chamber 31, in its lower part adjacent the partition 30, is constructed to constitute a cylinder 32, within which the piston 33 is slidably mounted, this piston being rigidly connected to the valve 26 by means of a connecting rod 34, which passes through a suitable opening 37, within the partition 30, suitable guiding flanges 38 being carried by the partition. The connecting rod 34 may be attached to the valve disc and to the piston in any suitable fashion, but a very satisfactory method is to attach them in the manner shown, the opposite ends of the connecting rod, where it passes through the valve disc and through the piston, being threaded and suitable retaining nuts positioned thereon, so that the relative distance between the valve disc and the piston may be adjusted as desired. Positioned between the cover plate 22 and the piston 33 is a spring 40, which normally urges the valve toward its seat and restrains the valve against opening movement until the predetermined pressure within the valve casing has been attained. The cap 22, also carries means for adjusting the tension of the spring 40, so that the valve may be set for opening at any predetermined pressure. This means may be of any suitable character, but is preferably a threaded plug 41, against the inner end of which the spring 40 bears, suitable wrench receiving surfaces being provided so that the plug may be moved in or out to give the desired spring tension.

The tension of the spring 40 having been suitably adjusted, the valve 26 will remain upon its seat so long as the pressure within the main 10 is below that predetermined pressure which is necessary for overcoming the tension of the spring and thus lifting the valve from its seat. When the valve 26 opens, the fluid within the main 10 passes through the valve to the vent pipe. Where this fluid carries impurities, such as the tar in producer gas, some of these impurities are deposited upon the face of the valve and upon the face of the valve seat, so that when the valve is once more returned to its seat it tends to stick or bind there. While the temperature of this part of the apparatus may be maintained sufficiently high during operation of the producer to prevent especially objectionable sticking of the valve, nevertheless after the producer has stood for a while without operating, as for instance when it is shut down over a week end or over night, the tar will harden and it will then take excessive pressure to lift the valve. It should be borne in mind that where gas is delivered from a producer, the pressure within the main 10 will seldom be more than a few pounds, under normal conditions.

In order to insure opening of the valve as soon as the predetermined pressure is exceeded, means is provided for forcing the valve from its seat, regardless of any sticking or binding thereof. This means comprises, partly, the piston 33 heretofore described, the construction being such that when the predetermined pressure in the delivery main is reached, which pressure should be slightly in excess of the pressure at which the relief valve is normally set to open, pressure fluid will be admitted into the cylinder 32 to move the piston 33 along that cylinder and thus at the same time move the valve 26 from its seat.

As shown the pressure fluid, which may be steam, compressed air, or the like, is supplied through the pipe 50, which leads from any suitable source of supply of pressure fluid. A valve 51 is positioned within this pipe 50 to control the flow of pressure fluid therethrough. This valve is in turn actuated by means of a pressure responsive device, which is subjected to the pressures existing within the delivery main. This pressure responsive device is shown as comprising a casing 55, having a flexible diaphragm 56 positioned therein, the stem 57, of the valve 51 being connected to this diaphragm. The space within the casing 55 on one side of the diaphragm is connected, by means of the pipe 58, to the interior of the delivery main. In the space within the casing 55 on the other side of the diaphragm is positioned a spring 60, one end of which bears against the threaded plug 61 which surrounds the valve stem and acts as a guide therefor. This plug is of such character that it may be adjusted to vary the tension of the spring as desired, to thus vary the pressure which must be attained within the delivery main 10 before the valve 51 will be opened. So long as the pressure within the main 10, during operation of the device, is below the predetermined pressure the tension of the spring 60 will hold the valve 51 upon its seat; but as soon as the pressure within the main 10 exceeds the predetermined pressure, this pressure acting upon the flexible diaphragm 56 will overcome the tension of the spring 60 and cause compression of that spring with a corresponding opening of the valve 51 to admit pressure fluid within the cylinder 32. This pressure fluid acting upon the piston 33 will move that piston, as described above.

The purpose of this part of the apparatus is to positively open the valve in case it sticks and thus refuses to open when the pressure normally tending to open that valve has been attained. Therefore some means must be provided for cutting off the supply of pressure fluid after the valve 51 has once been open, as otherwise the valve 26 will be maintained in open position indefinitely. Of course if desired a manually operated valve may be provided for accomplishing this purpose, but preferably the apparatus is so arranged that as soon as the valve 26 is moved from its seat, so that its direct responsiveness to pressures within the main 10 is assured, the pressure fluid will be cut off.

In order to accomplish this purpose the piston 33 is so positioned within the cylinder 32 that a very slight movement of the piston will carry it completely out of the cylinder, into the space 31, which space is of greater diameter than the diameter of the cylinder. A passage 70, is provided in the wall of the body member 20 connecting the space 31 to atmosphere so that as soon as the piston 33 moves out of the cylinder, any pressure fluid which passes through the pipe 50 into the cylinder will escape into the atmosphere.

In practice, however, the spring 60 is so set that the valve 51 tends to open at a pressure only slightly in excess of the pressure tending to open the valve 26. As soon as the valve 26 is really open therefore, and the pressure within the main 10 relieved to bring that pressure back to normal, the pressure tending to open the valve 51 will not be sufficient for that purpose and that valve will therefore close. The valve 26 will then be responsive only to pressure conditions within the main acting directly on that valve.

Preferably a drain plug 75 is provided within the cylinder 32.

While this valve is described as being primarily adapted for functioning in connection with a gas producer plant, it is obvious that it is not thus limited in its applicability. The valve 26 may tend to stick or bind to its seat not only as the result of the accumulation of tar and the like, but it may tend to rust shut, or the main 10 may be used for delivering some other fluid which tends to stick or bind the valve to its seat.

While the form of apparatus herein described constitutes a preferred embodiment of the invention, it is to be understood that the invention is not limited to this precise form of apparatus, and that changes may be made in either without departing from the scope of the invention which is defined in the appended claims.

What is claimed is:

1. A valve of the character described, comprising a valve member, means urging the valve member toward its seat, said means being so constructed that the valve member is held to its seat so long as the pressure within the passage with which said valve is associated does not exceed a predetermined pressure; means for forcing open said valve when a predetermined pressure is attained within said passage; and means cooperating with said opening means and independent of the pressure within said passage arranged to permit said opening means to be automatically cut out of operation when the valve is moved a predetermined distance from its seat.

2. A pressure relief valve comprising a valve member, a spring urging said valve toward closed position, means tending to cause opening of said valve when the pressure exerted thereon exceeds a predetermined pressure; said means comprising an operating stem connected to said valve, a cylinder surrounding said operating stem, a piston within said cylinder carried by the operating stem, means for introducing a pressure fluid into said cylinder; and means independent of the pressure exerted on the valve for automatically cutting out of operation the said opening means when the valve is moved a predetermined distance from its seat.

3. A pressure relief valve comprising a casing, a valve member within said casing constructed to normally open under the influence of a predetermined pressure within the said casing, a spring cooperating with said valve for resisting opening movement of said valve member until a predetermined pressure has been reached, means actuated by the pressure within said valve casing for forcing said valve from its seat when a definite pressure in excess of the said predetermined pressure has been reached, and means for automatically rendering ineffective said forcing means when the valve member has been opened a predetermined distance.

4. A pressure relief valve comprising a casing having a partition therein, dividing the interior of the casing into a valve chamber and a cylinder; a valve member positioned within said valve chamber constructed to open under the pressure within said chamber, a spring cooperating with said valve member for resisting opening movement of said valve member until a predetermined pressure has been reached; means responsive to pressure conditions within the valve chamber upon the inlet side of the valve member for introducing a pressure fluid into the said cylinder beneath the piston to force the valve from its seat when a given pressure in excess of the predetermined pressure has been reached; and means for connecting the interior of the said cylinder beneath the piston to atmosphere when the valve has opened a predetermined distance, whereby the valve will act thereafter independently of the said pressure fluid.

5. A pressure relief valve comprising a casing having a valve chamber therein, a valve member within said chamber and constructed to normally open under the pressure upon said valve member; a cylinder outside of said valve chamber, a stem connected to the valve member and extending into the said cylinder, a piston upon said stem within said cylinder; a spring cooperating with said valve and restraining said valve against opening until a predetermined pressure has been reached, said parts being so constructed as to maintain said pressure during normal operation of said valve below said predetermined pressure; and means responsive to pressure conditions upon the inlet side of the valve for introducing a pressure fluid from an independent source into said cylinder beneath the piston for forcing the valve from its seat when a pressure in excess of the said normal predetermined pressure has been reached.

In testimony whereof I hereto affix my signature.

HARRY F. SMITH.

CERTIFICATE OF CORRECTION.

Patent No. 1,664,493.                                Granted April 3, 1928, to

HARRY F. SMITH.

It is hereby certified that error appears in the printed specification of the above numbered patent requiring correction as follows: Page 4, line 28, claim 3, after the word "means" insert the words "independent of the pressure in said casing"; and that the said Letters Patent should be read with this correction therein that the same may conform to the record of the case in the Patent Office.

Signed and sealed this 15th day of May, A. D. 1928.

(Seal)

M. J. Moore,
Acting Commissioner of Patents

2. A pressure relief valve comprising a valve member, a spring urging said valve toward closed position, means tending to cause opening of said valve when the pressure exerted thereon exceeds a predetermined pressure; said means comprising an operating stem connected to said valve, a cylinder surrounding said operating stem, a piston within said cylinder carried by the operating stem, means for introducing a pressure fluid into said cylinder; and means independent of the pressure exerted on the valve for automatically cutting out of operation the said opening means when the valve is moved a predetermined distance from its seat.

3. A pressure relief valve comprising a casing, a valve member within said casing constructed to normally open under the influence of a predetermined pressure within the said casing, a spring cooperating with said valve for resisting opening movement of said valve member until a predetermined pressure has been reached, means actuated by the pressure within said valve casing for forcing said valve from its seat when a definite pressure in excess of the said predetermined pressure has been reached, and means for automatically rendering ineffective said forcing means when the valve member has been opened a predetermined distance.

4. A pressure relief valve comprising a casing having a partition therein, dividing the interior of the casing into a valve chamber and a cylinder; a valve member positioned within said valve chamber constructed to open under the pressure within said chamber, a spring cooperating with said valve member for resisting opening movement of said valve member until a predetermined pressure has been reached; means responsive to pressure conditions within the valve chamber upon the inlet side of the valve member for introducing a pressure fluid into the said cylinder beneath the piston to force the valve from its seat when a given pressure in excess of the predetermined pressure has been reached; and means for connecting the interior of the said cylinder beneath the piston to atmosphere when the valve has opened a predetermined distance, whereby the valve will act thereafter independently of the said pressure fluid.

5. A pressure relief valve comprising a casing having a valve chamber therein, a valve member within said chamber and constructed to normally open under the pressure upon said valve member; a cylinder outside of said valve chamber, a stem connected to the valve member and extending into the said cylinder, a piston upon said stem within said cylinder; a spring cooperating with said valve and restraining said valve against opening until a predetermined pressure has been reached, said parts being so constructed as to maintain said pressure during normal operation of said valve below said predetermined pressure; and means responsive to pressure conditions upon the inlet side of the valve for introducing a pressure fluid from an independent source into said cylinder beneath the piston for forcing the valve from its seat when a pressure in excess of the said normal predetermined pressure has been reached.

In testimony whereof I hereto affix my signature.

HARRY F. SMITH.

CERTIFICATE OF CORRECTION.

Patent No. 1,664,493.  Granted April 3, 1928, to

HARRY F. SMITH.

It is hereby certified that error appears in the printed specification of the above numbered patent requiring correction as follows: Page 4, line 28, claim 3, after the word "means" insert the words "independent of the pressure in said casing"; and that the said Letters Patent should be read with this correction therein that the same may conform to the record of the case in the Patent Office.

Signed and sealed this 15th day of May, A. D. 1928.

(Seal)

M. J. Moore,
Acting Commissioner of Patents.